(12) United States Patent
Bahler et al.

(10) Patent No.: US 10,667,498 B2
(45) Date of Patent: Jun. 2, 2020

(54) WRAPPED AVIARY CONSTRUCTION SYSTEM AND METHOD THEREOF

(71) Applicant: Summit Livestock Facilities, LLC, Remington, IN (US)

(72) Inventors: Ed Bahler, Remington, IN (US); Alan Schambach, Remington, IN (US); Loren Honegger, Remington, IN (US)

( * ) Notice: Subject to any disclaimer, the term of this patent is extended or adjusted under 35 U.S.C. 154(b) by 330 days.

(21) Appl. No.: 15/493,595

(22) Filed: Apr. 21, 2017

(65) Prior Publication Data

US 2017/0339925 A1 Nov. 30, 2017

Related U.S. Application Data

(60) Provisional application No. 62/341,412, filed on May 25, 2016.

(51) Int. Cl.
*A01K 31/18* (2006.01)
*A01K 31/06* (2006.01)

(52) U.S. Cl.
CPC .............. *A01K 31/18* (2013.01); *A01K 31/06* (2013.01)

(58) Field of Classification Search
CPC ...... A01K 31/18; A01K 31/06; A01K 31/005; A01K 31/002; A01K 31/007; A01K 31/20; A01K 31/19; A01K 31/22; E04B 7/024; E04B 1/19; E04B 1/24; E04B 2001/199; E04B 2001/2481

See application file for complete search history.

(56) References Cited

U.S. PATENT DOCUMENTS

| | | | | |
|---|---|---|---|---|
| 2,061,712 A * | 11/1936 | Martin | ............... | A01K 31/18 119/306 |
| 2,335,173 A * | 11/1943 | Corey | ............... | A01K 1/0047 119/448 |
| 3,000,290 A * | 9/1961 | Rodick | ............... | A01K 31/00 454/252 |
| 3,124,101 A * | 3/1964 | Wierenga, Sr. | ...... | A01K 31/17 119/458 |
| 3,312,194 A * | 4/1967 | Ernst | ............... | A01K 31/04 119/457 |
| 3,389,687 A * | 6/1968 | Trussell | ............... | A01K 31/005 119/448 |
| 3,900,006 A * | 8/1975 | Shockley, Jr. | ...... | A01K 31/005 119/457 |
| 3,994,260 A * | 11/1976 | Fleshman | ............... | A01K 31/002 119/480 |
| 5,036,797 A * | 8/1991 | Koozer | ............... | A01K 1/0058 119/448 |

(Continued)

*Primary Examiner* — Trinh T Nguyen
(74) *Attorney, Agent, or Firm* — Tyler B. Droste; Gutwein Law

(57) ABSTRACT

A method of constructing an aviary structure is provided. The method includes steps of forming a foundation and coupling an internal support structure to the foundation. The internal support structure is coupled to the foundation at least in part by coupling a plurality of aviary cages to the foundation, coupling a plurality of peripheral columns to the foundation, and coupling the aviary cages with the peripheral columns using bracing. The method also includes steps of coupling at least one side wall to the peripheral columns, coupling the roof assembly to vertical support members of the aviary cages, and coupling said external paneling to the side wall and the roof assembly.

8 Claims, 18 Drawing Sheets

(56) References Cited

U.S. PATENT DOCUMENTS

| | | | |
|---|---|---|---|
| 9,538,731 B2* | 1/2017 | Rust | A01K 31/165 |
| 2004/0144329 A1* | 7/2004 | Kuhlmann | A01K 31/04 |
| | | | 119/458 |
| 2015/0122193 A1* | 5/2015 | Rust | A01K 31/17 |
| | | | 119/334 |
| 2015/0122195 A1* | 5/2015 | Rust | A01K 31/005 |
| | | | 119/455 |
| 2015/0126105 A1* | 5/2015 | Rust | A01K 31/00 |
| | | | 454/338 |
| 2015/0230432 A1* | 8/2015 | Rust | A01K 31/12 |
| | | | 119/468 |
| 2015/0230433 A1* | 8/2015 | Dart | A01K 31/22 |
| | | | 119/468 |
| 2017/0223904 A1* | 8/2017 | Raccanello | A01G 9/247 |

* cited by examiner

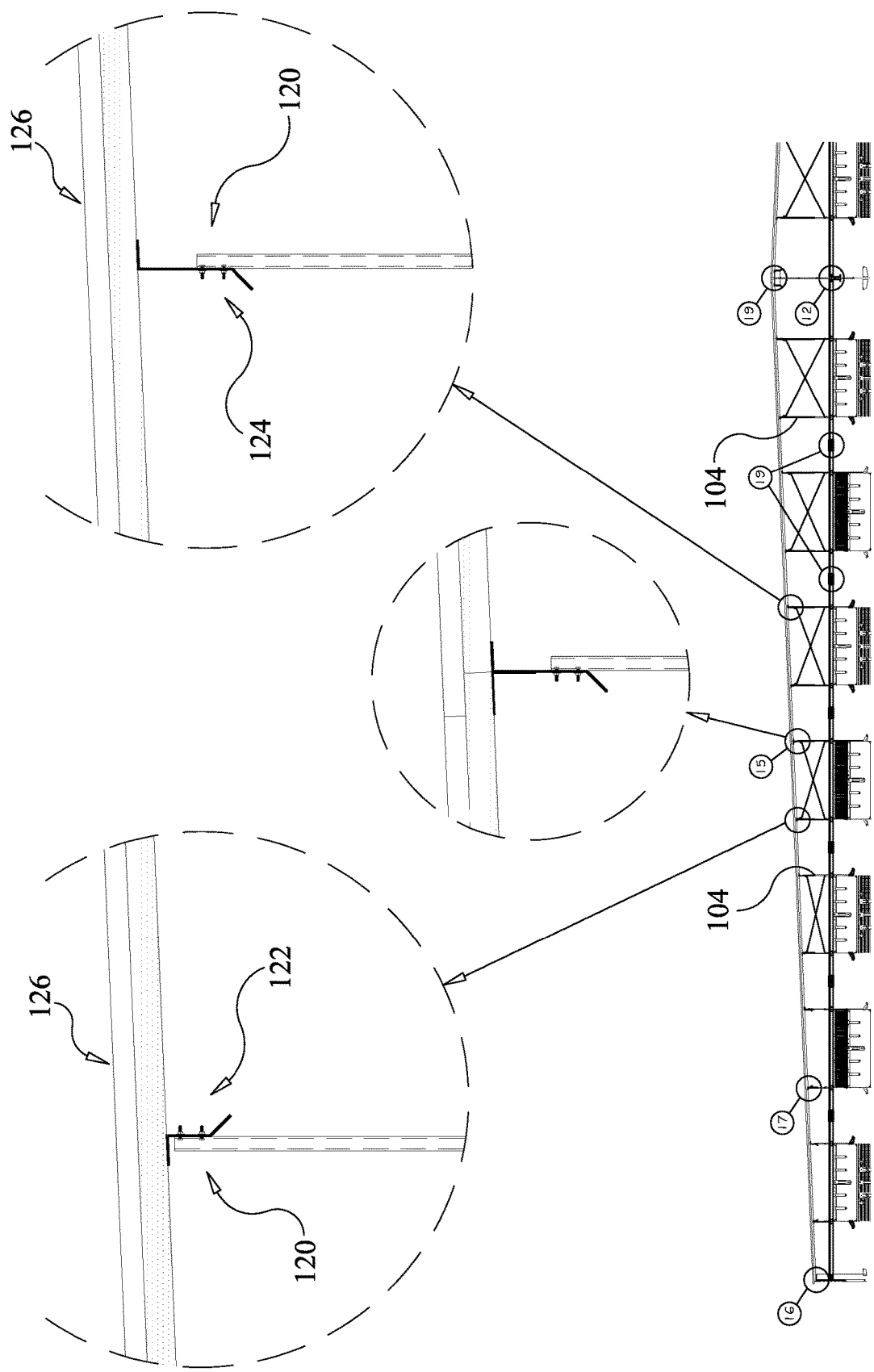

WRAPPED AVIARY CONSTRUCTION SYSTEM AND METHOD THEREOF

CROSS-REFERENCE TO RELATED APPLICATION

This U.S. Patent Applications claims priority to U.S. Provisional Application No. 62/341,412 filed on May 25, 2016, the disclosure of which is considered part of the disclosure of this application and is hereby incorporated by reference in its entirety.

FIELD OF THE INVENTION

This invention relates generally to building construction, specifically that of aviaries and, more particularly, to a system and method for constructing an aviary.

BACKGROUND

Generally, aviaries are constructed as a building or enclosure having a plurality of cages positioned therein. With specific regard to cages used to house hens, the cages typically include nesting areas for the hens, as well as areas for the hens to move around, scratch and peck. Some modern aviaries also include means for automated egg collection. The building shields the hens from inclement weather, prevents the hens from wandering off and protects the hens from outside predators. As such, the building, or structure at least partially enclosing the cages, should be structurally sound and capable of effectively providing the necessary safety and protection for the hens.

Typically, an aviary is constructed by first pouring a concrete foundation. The building is then constructed and secured to this foundation by building walls and securing the walls to the concrete. A roof is then constructed and secured to the walls. After construction of the building is complete, the cages are constructed within the building. Unfortunately, this method of constructing the aviary is slow and costly. A need remains for a system and method for constructing an aviary that is faster and more efficient that conventional means.

The present disclosure is directed to such an endeavor.

BRIEF SUMMARY OF THE INVENTION

In one aspect, a method of constructing an aviary structure is provided. The aviary structure includes a foundation, an internal support structure, at least one side wall, a roof assembly, and exterior paneling. The method includes steps of forming the foundation and coupling the internal support structure to the foundation. The internal support structure is coupled to the foundation at least in part by coupling a plurality of aviary cages to the foundation, coupling a plurality of peripheral columns to the foundation, and coupling the aviary cages with the peripheral columns using bracing. The method also includes steps of coupling at least one side wall to the peripheral columns, coupling the roof assembly to vertical support members of the aviary cages, and coupling said external paneling to the side wall and the roof assembly.

In another aspect, an aviary structure includes a foundation, an internal support structure including a plurality of aviary cages coupled to the foundation and a plurality of peripheral columns coupled to the foundation. The aviary cages are coupled with the peripheral columns using bracing. The aviary structure also includes at least one side wall coupled to the peripheral columns, a roof assembly coupled to vertical support members of the aviary cages, and a plurality of wall panels supported on the side wall and a plurality of roof panels supported on the roof assembly.

BRIEF DESCRIPTION OF THE DRAWINGS

The features and advantages of this disclosure, and the manner of attaining them, will be more apparent and better understood by reference to the following descriptions of the disclosed system and method, taken in conjunction with the accompanying drawings, wherein:

FIG. 5 is a view of exemplary embodiments of various purlin location and orientations used to support and connect the roof assembly to the cage assemblies and support structures;

DETAILED DESCRIPTION OF THE INVENTION

Figure 1:
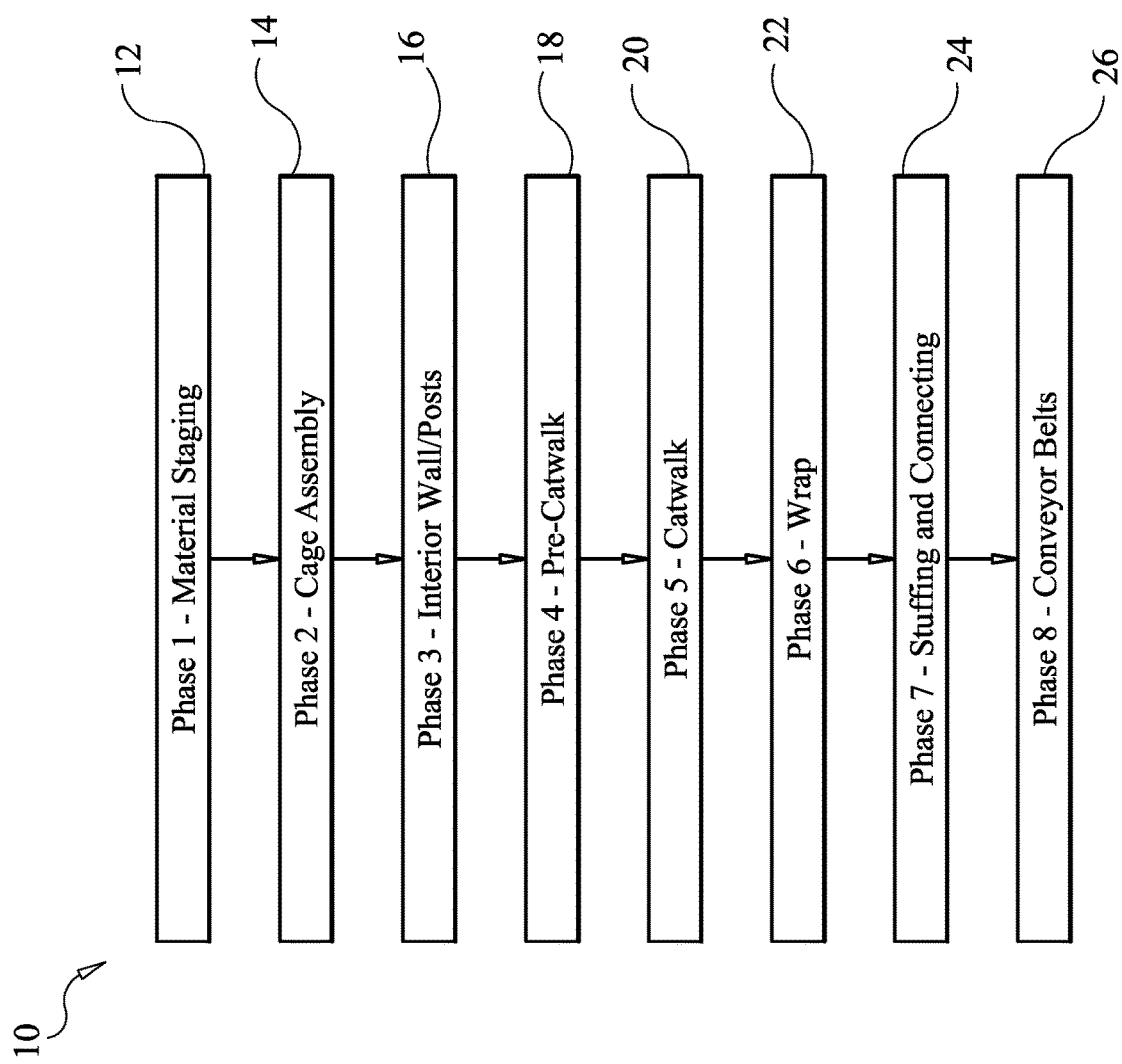
FIG. 1 is a diagram depicting exemplary staging phases of components necessary to construct an aviary of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The staging procedure and various phases of constructing an aviary construction system, also referred to as an aviary or aviary system, according to the present disclosure are illustrated at 10 in FIG. 1. In one aspect, embodiments of the aviary construction system presently disclosed allow cages to be staged on a foundation and constructed in tandem with a support structure. The exterior walls and roof, or exterior paneling, can then be "wrapped" around the cages and support structures. External anchor points and braces can be used to provide additional structural support. In effect, the cage assemblies and interior support studs and columns can be coupled to the foundation and braced together to provide the internal support structure for the building.

As will be described in greater detail below, the aviary structure, constructed using the aviary construction system of the present disclosure, may be constructed in overlapping phases according to the disclosed "wrap-the-cage" construction. Assuming a foundation has already been formed, Phase 1, represented at Box 12, may include a process of staging materials for construction that can first be positioned in proximity to the foundation of the aviary structure, such as according to a staging map. During the staging, a grid, or other markings, can be etched on the surface of the foundation to identify the location of the internal support structures, such as cages, or cage assemblies, columns and/or studs, as well as the coupling/fastening points of the internal support structure to the foundation. Sub-assemblies can then be built and staged on the foundation.

Phase 2, shown at Box 14, is comprised of step-by-step cage frame assembly, or cage assembly. According to some embodiments, and as will be described below, two rows of cages may be built concurrently to optimize efficiency and material work-flow using one or more work stations and custom jigs.

Phase 3 (Box 16) consists of constructing an interior partition wall and setting the steel columns/studs to couple them to the foundation. The columns for the interior partition wall are first coupled to the foundation down the center of the aviary structure. Then, the columns and studs for the external walls surrounding a peripheral edge of the foundation are coupled to the foundation. As will be discussed below, the columns and studs are coupled to the foundation using any suitable means, such as concrete anchor screws. In one exemplary embodiment, the columns can be positioned about every 48 feet from each other with studs spaced about every 8 feet in-between the columns.

Phase 4, at Box 18, is a pre-catwalk construction, which, in one embodiment, can comprise a team of about 2 workers installing light wiring and lights in the rows of the cages or cage assemblies, and/or the walkways between the rows of cage assemblies. In one embodiment, an installation team of about four employees can install the wires. The lights and mesh can then be installed. The mesh and other elements installed can include floor supports, inside perch supports, pen dividing mesh, floor mesh and clips, and the hangers and egg/manure belts.

During Phase 5, shown at Box 20, the catwalk installation is completed. In one embodiment, this phase is completed with a team of about eight workers. This phase can include coupling the bracing/brackets between the cage assemblies and the columns/studs. Similarly, the bridges can be coupled between rows of cage assemblies.

Phase 6, illustrated at Box 22, can begin the "wrap-the-cage" process of installing the wall and roof panels to the columns/studs and the roof assembly. In one exemplary embodiment, a suction cup machine known as a "Gripper" can be used to aid in installing the wall panels. In one embodiment, the wall panel team can consist of about five workers. Similarly, the roof panel team can use a similar "Gripper" machine to aid in installing the roof panels to the roof assembly.

Phase 7, at Box 24, is directed to stuffing and connecting, and is a follow-up installation from Phase 4. During this phase, workers can complete the stuffing of the cage assemblies and connections of all the ancillary components of the cages assemblies. This can include, but is not limited to catwalks; perch, waterline and trough connections; offset mesh and bar; manure belts; main frame (elbows, idlers, etc.); egg belts; feed chain; perch brackets; egg belt covers; nests; egg rollers and supports; perch level pen mesh; perch level middle mesh; perch level perch and connection; water systems; egg collectors; exterior feed systems; doors; ramps; scrapers; curtains; and cool cells.

Lastly, in Phase 8 (Box 26), a final set of conveyor belts for movement of eggs and manure can be installed and completed. The egg conveyors can extend along the sides of the nesting platforms and carry the eggs from the nesting area to a collection area. The egg conveyor can extend from a first outside surface and extend substantially over the length of the row of cage assemblies. Each level of cages within a row of cage assemblies can have its own egg conveyor. Additionally, each side of the cage assemblies can have a dedicated egg conveyor. Similarly, each level of cages can have a manure removal belt or conveyor that can carry manure from the cage assembly to a collection area positioned outside of the cage assembly. In one exemplary embodiment, the manure can be carried to a position outside of the aviary into a manure storage area.

It should be noted that the various elements of each of the embodiments described below may be combined in any manner to form new embodiments of an aviary structure.

Material Staging

As mentioned above, materials may first be positioned by proximity of use and physically cordoned off by category at a staging area, according to a material staging map. By pre-defining areas by category according to the material staging map, the system of the present disclosure can help eliminate potential language barriers by users, increase the likelihood that the building inventory is accurate, accommodate a quick receipt of large quantities, and facilitate predictability during use, re-stocking, and progression of a construction project.

Initially a construction platform or foundation 44, shown in FIGS. 3B and 8-11, must first be established. In one exemplary embodiment, the forming of the construction platform can be the pouring of a concrete slab on which the remaining construction will be conducted. Alternative embodiments can use any suitable construction platform material including, for example, asphalt. The foundation 44 can be etched with etching to lay out support structure and cage placement to increase construction efficiency and facilitate a more robust finished product. The etching on the foundation 44 can be done by a laser or other suitable means.

Some of the sub-assemblies can be pre-assembled prior to being moved and placed on the foundation 44. The sub-assemblies can then be fastened or secured to the foundation structure 44. Various sub-assemblies can be coupled to each other to form a larger assembly, such as a cage assembly. That is, for example, multiple cages or a cage with various components or accessories may define a cage assembly. A predetermined distance from the main concrete slab, small dead man foundations can be poured or established. A plurality of these foundations can be used surrounding the perimeter of the concrete slab. These foundations can further use diagonal rod braces (detailed below) to anchor the internal support structure and thereby externally support the aviary structure.

Cage Assembly and Internal Support Structure

A plurality of steel studs 50 and/or columns 52 can be used throughout the building as mounting points for cage assemblies. It is understood that the studs 50 and columns 52 can be made of any suitable material and their construction is not limited to steel. The studs 50 and columns 52 are first coupled to the foundation 44 of the aviary using any suitable means. The studs 50 and columns 52 can be positioned around the peripheral edge of the foundation 44 and the center of the foundation 44 as illustrated in FIGS. 2C and 2D.

A cage can be defined to include an outside surface and an inside area. The outside surface of each cage can be coupled to the outside surface of another cage. A plurality of cages can be stacked on top of one another to form a cage assembly having multiple levels of cages. In one exemplary embodiment, a cage assembly can have two levels: an upper level and a lower level. In yet another exemplary embodiment, three cages can be coupled on top of one another to form a cage assembly having a lower, intermediate, and upper level. The cage assemblies can be positioned in accordance with the grid etched in the foundation 44 or according to other pre-determined locations. Successive cage assemblies can be coupled together to form a row of cage assemblies that span a given length within an aviary structure.

Figure 2A:
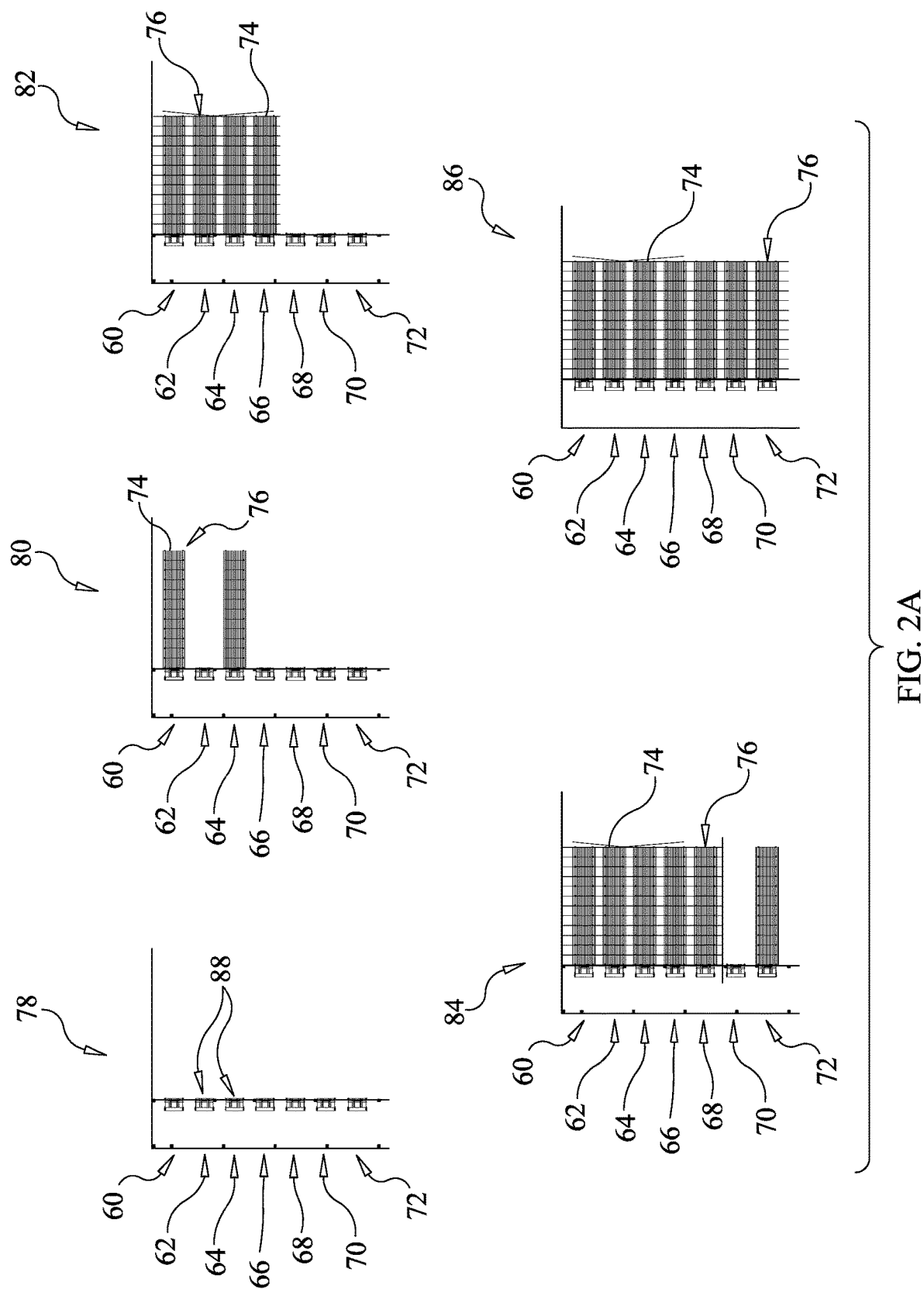
FIG. 2A is a diagram depicting the row construction of the cage assemblies on a foundation.

As depicted in FIG. 2A, two of rows 60-72 of cages 74 can be built concurrently in a pre-described sequence to optimize the manpower efficiencies and the material work flow. For example, cage assemblies 76 may be constructed in three assembly stations. The sub-assemblies do not need to be stacked, but can be positioned on the foundation 44 prior to assembly of the cages 74. Each of the three work stations can be optimized by custom jigs to ensure that all needed components are ergonomically available and culminate in just-in-time cage assembly to align with the anticipated construction schedule and process.

The aforementioned assembly stations can include a cross support assembly station where a single person can assemble the cross supports, install perches, troughs, and water supports on the cross supports, and then stack the completed units to be used on moveable carts.

The next station can be a cage leg wall and foot assembly station. Two people can work in tandem to fasten cross members to legs 54 of the cages 74. The personnel can then stand the assembled legs 54 onto a moveable cart. Prior to being moved to the next station, a single worker can anchor and level the feet, assuring installation is straight, plumb, and level.

A third station can include a cage assembly station. The cage assembly station can include a crew of up to four workers that work to connect the legs 54 to one another. A tandem pair of intermediate and purlin installers can first install the intermediate supports. The purlins can then be installed, followed by the middle mesh. Finally, the longitudinal members can be installed, in one example, by the tandem pair of workers.

As depicted in FIG. 2A, the cage assemblies 76 can be arranged into position on the concrete slab, or foundation, 44 according to the predetermined layout etched on the slab. According to one exemplary construction, or assembly, method, two rows of cage assemblies 76 can be constructed simultaneously, as depicted in steps 78-86. Prior to positioning the cage assemblies 76, manure drives 88 may be placed in the appropriate location to establish the location of each of rows 60-72. The cage assemblies 76 can then be coupled to the manure drives 88.

Figure 2B:
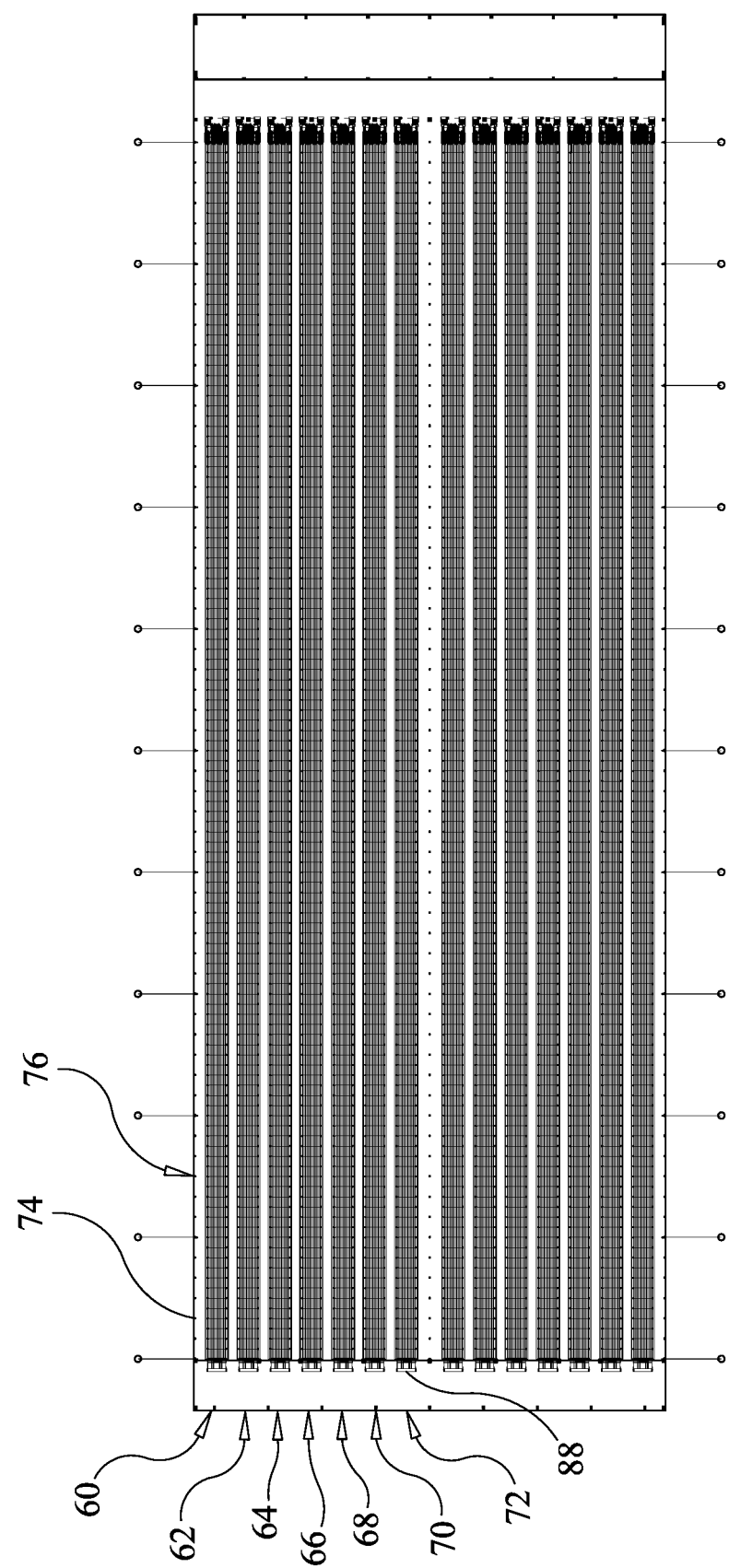
FIG. 2B is an aviary diagram of the completely constructed rows of the aviary.
Figure 2C:
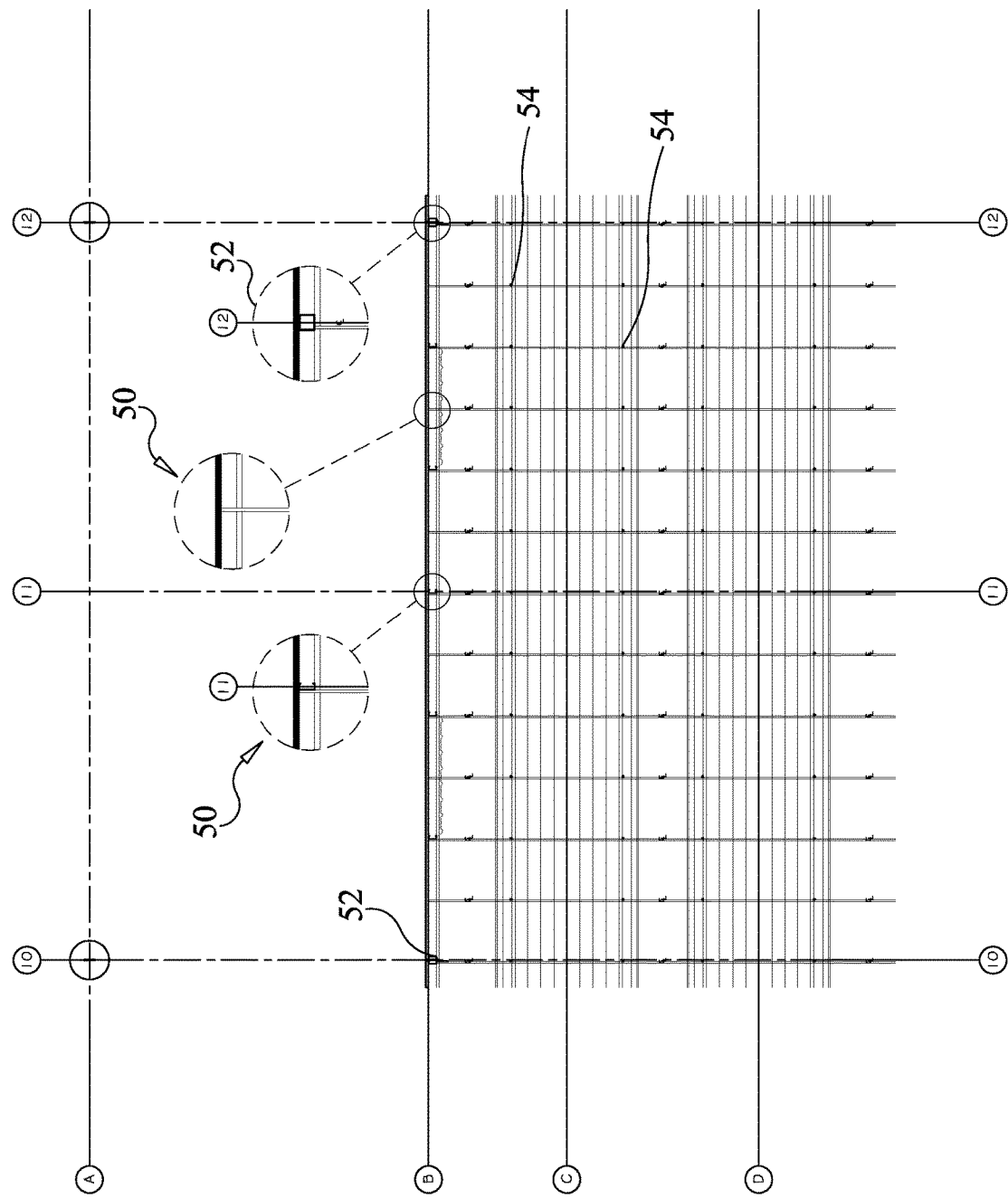
FIG. 2C is a framing layout of a side wall section of an exemplary embodiment of an aviary.
Figure 2D:
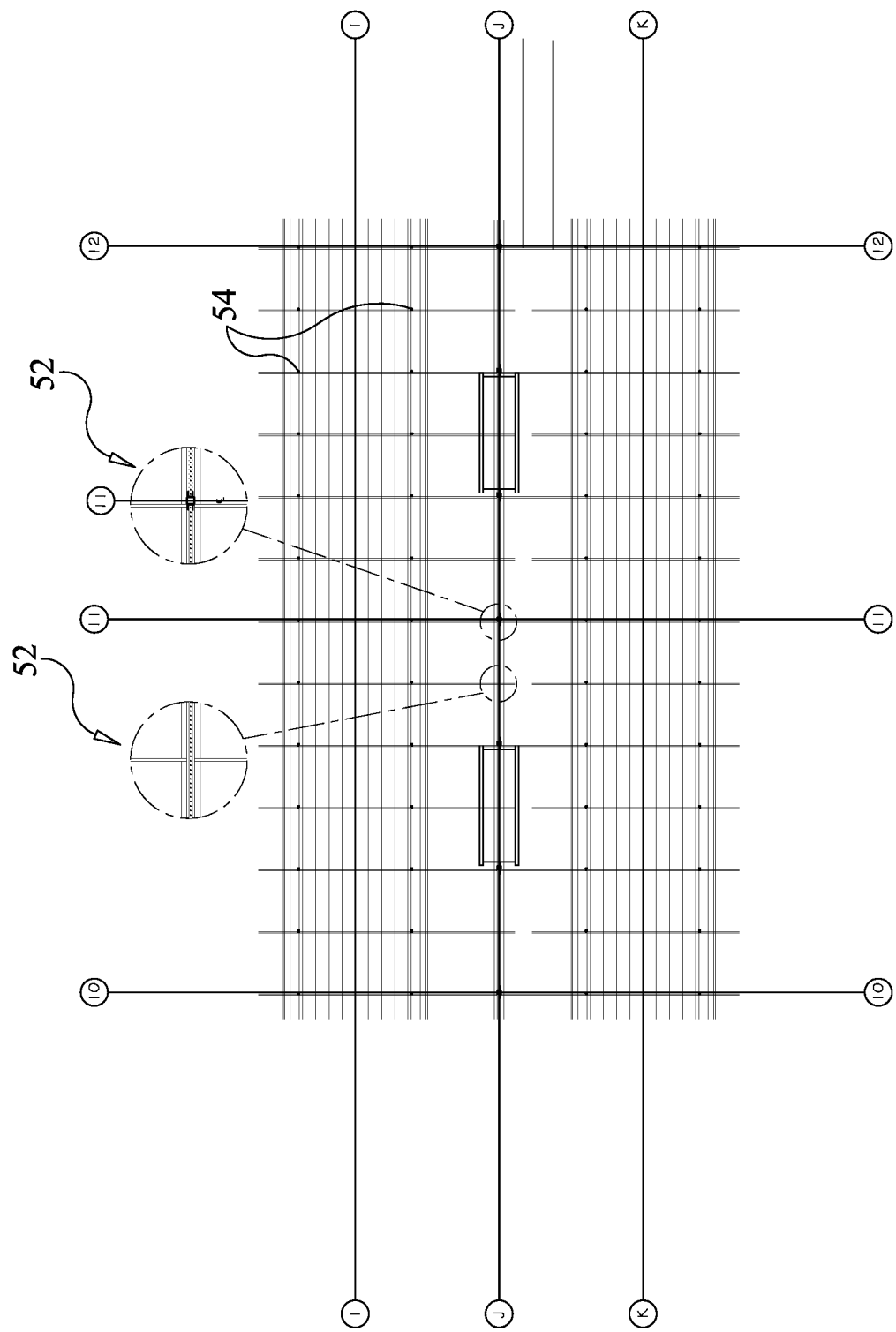
FIG. 2D is a framing layout of a center partition wall of an exemplary embodiment of an aviary.
Figure 2E:
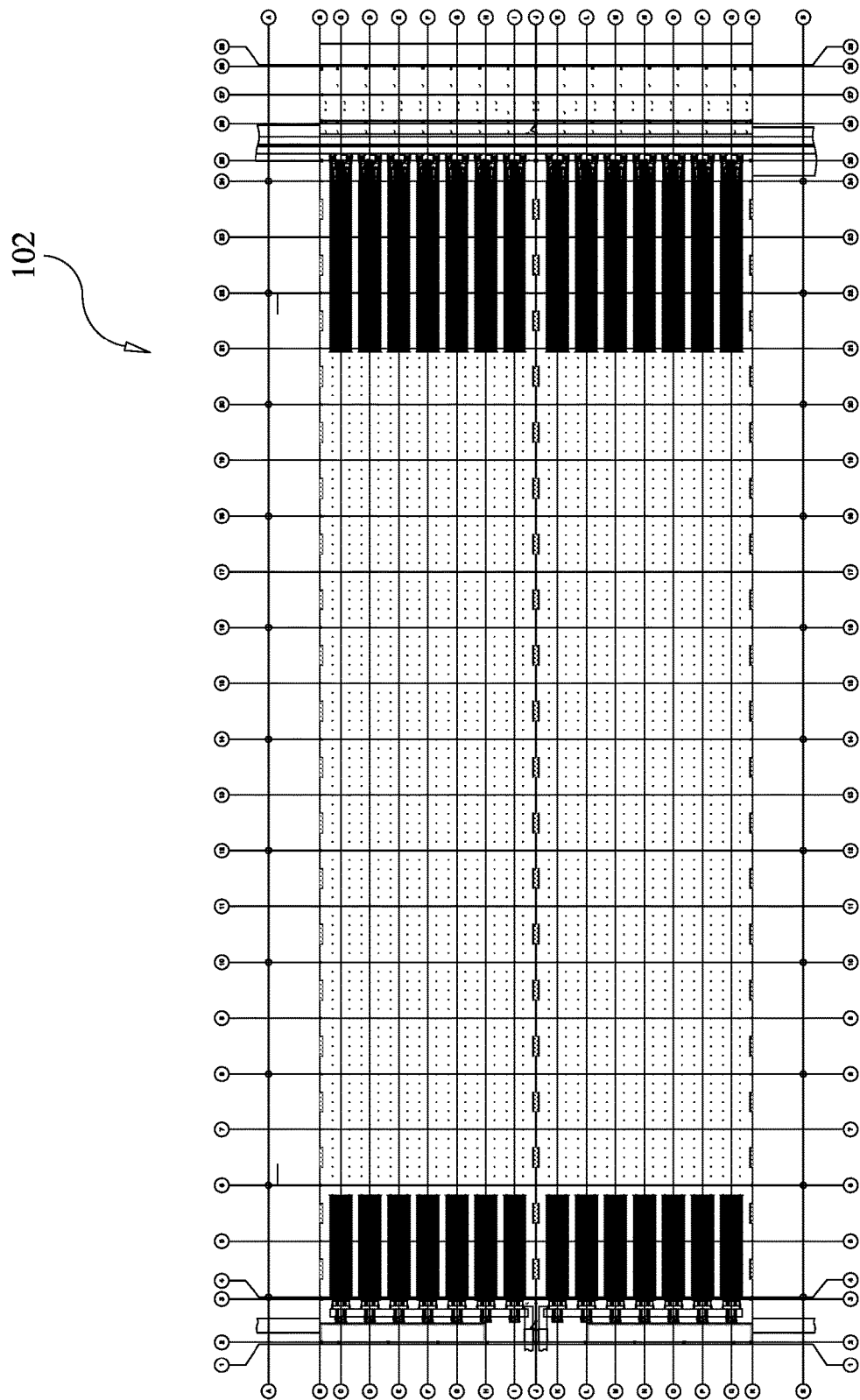
FIG. 2E is a diagram of a complete aviary structure illustrating various portions of the present invention.

When constructing two rows 60, 64 simultaneously, a row 62 is left open in-between the two rows 60, 64 that are being assembled. This allows ample space to efficiently erect the cage assemblies 76 in the two rows 60, 64. Once the first two rows 60, 64 are assembled, construction of the next two rows 62, 66 can occur, with the row 62 that was initially left open being constructed simultaneously with a row 66 adjacent to the previously assembled rows 60, 64. FIGS. 2A and 2B illustrate an exemplary method of construction where rows 60, 64 are simultaneously assembled, followed by rows 62, 66. Rows 68, 72 can then be assembled, followed by row 70. Additional rows can be constructed in the same manner until the desired number of rows is achieved. Alternatively, the rows can be constructed in any suitable manner or order to maximize the efficiency of the construction process. A completed aviary structure is shown generally in FIG. 2E at 102.

Figure 8:
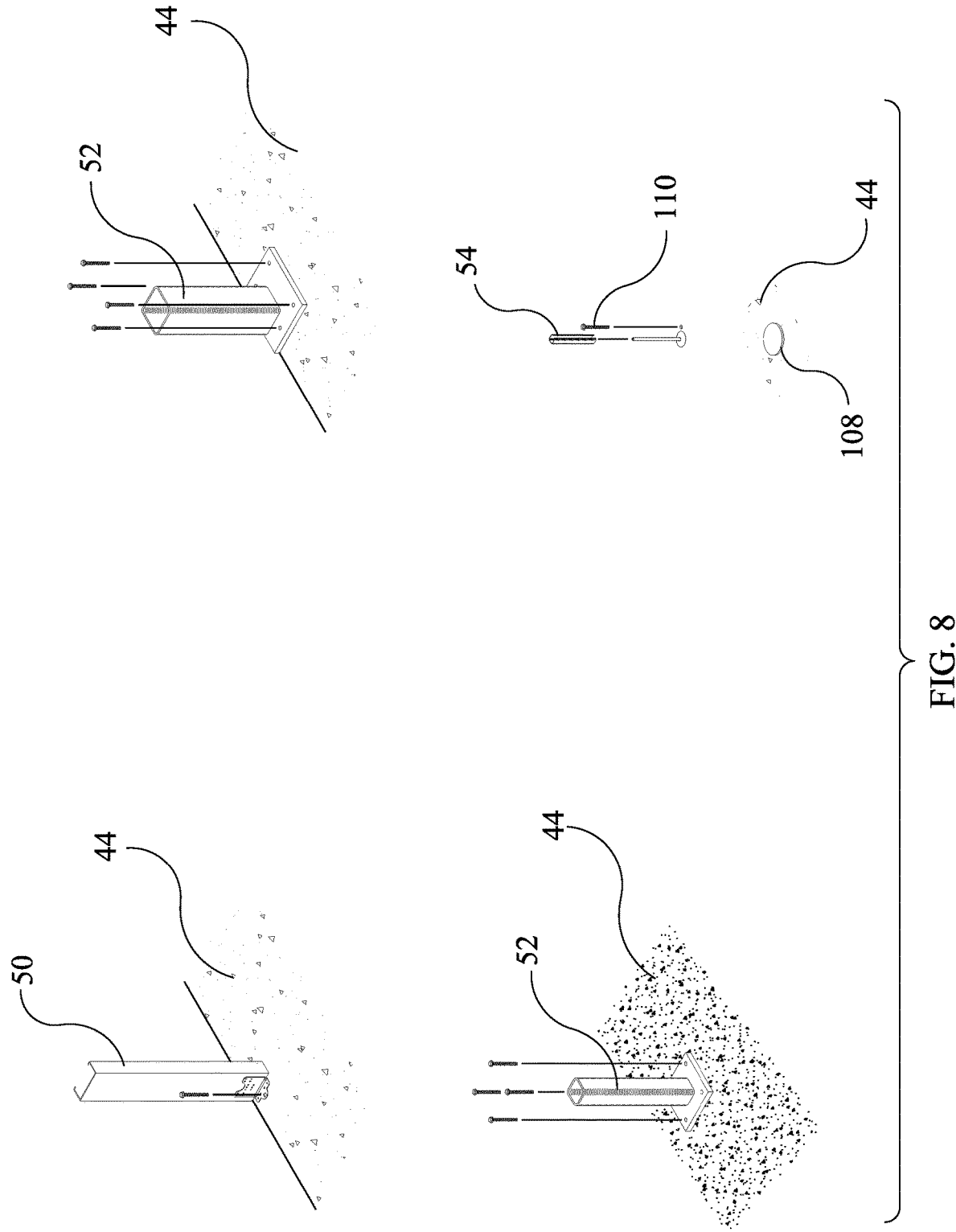
FIG. 8 is a perspective view of exemplary embodiments of the support structure used throughout the aviary for the cage assemblies to be anchored through various bracing.

A plurality of steel studs 50 and steel columns 52 anchored to the concrete slab 44 can surround the perimeter of the slab 44. As shown in FIG. 8, the steel studs 50 and columns 52 can be coupled to the concrete slab 44 using any suitable means, such as concrete anchor screws or bolts. The steel stud 50 can have a base end and a top end. The base end can be coupled to the concrete slab 44 in accordance to the predetermined layout that is etched on the concrete slab 44. Similarly, a plurality of steel studs 50 and steel columns 52 may be anchored to the concrete slab down the center of the aviary foundation 44.

Figure 4A:
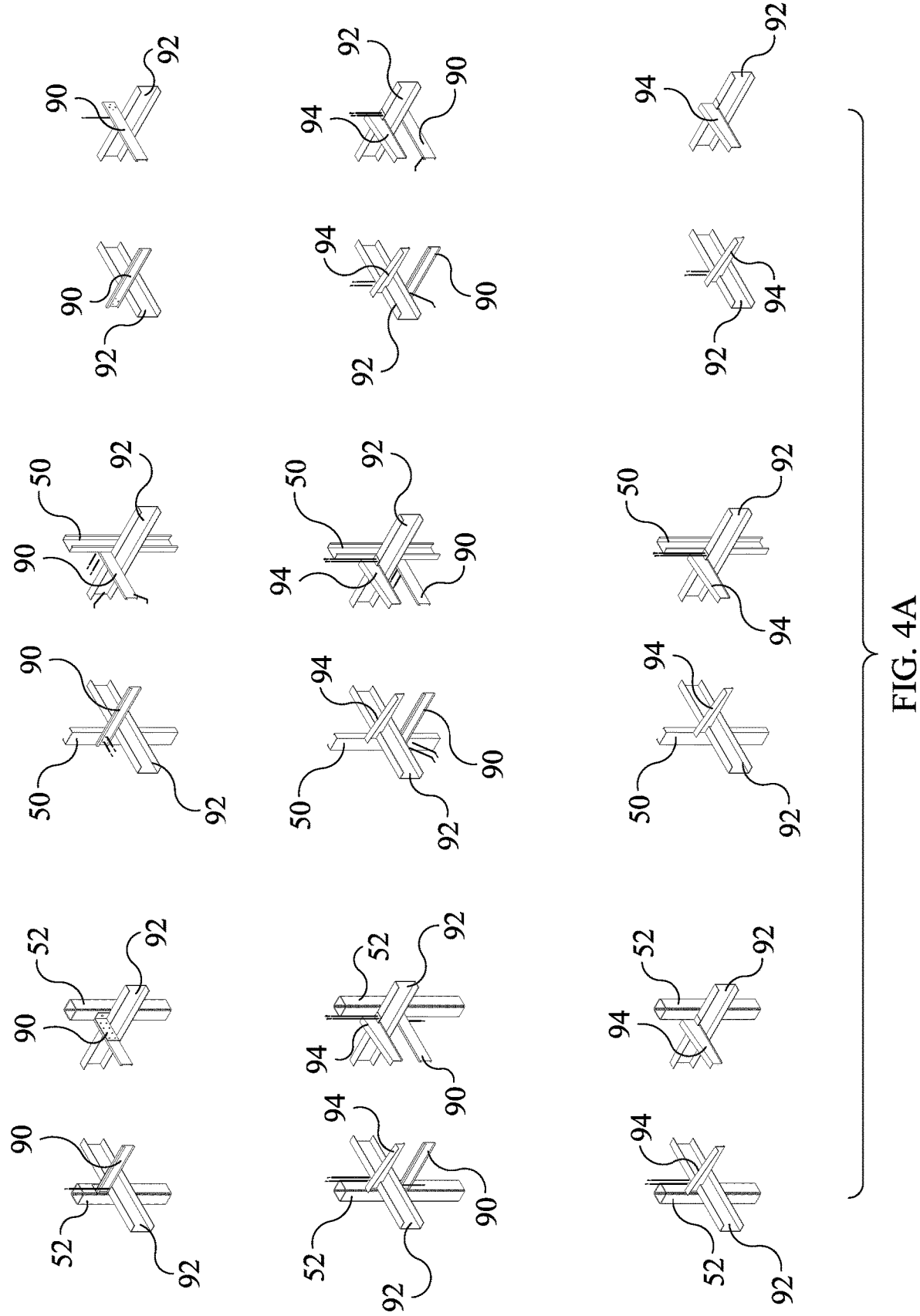
FIG. 4A is an exemplary embodiment of attachment means for the bracing, catwalk bridges and support studs and columns used in the present invention.
Figure 4B:
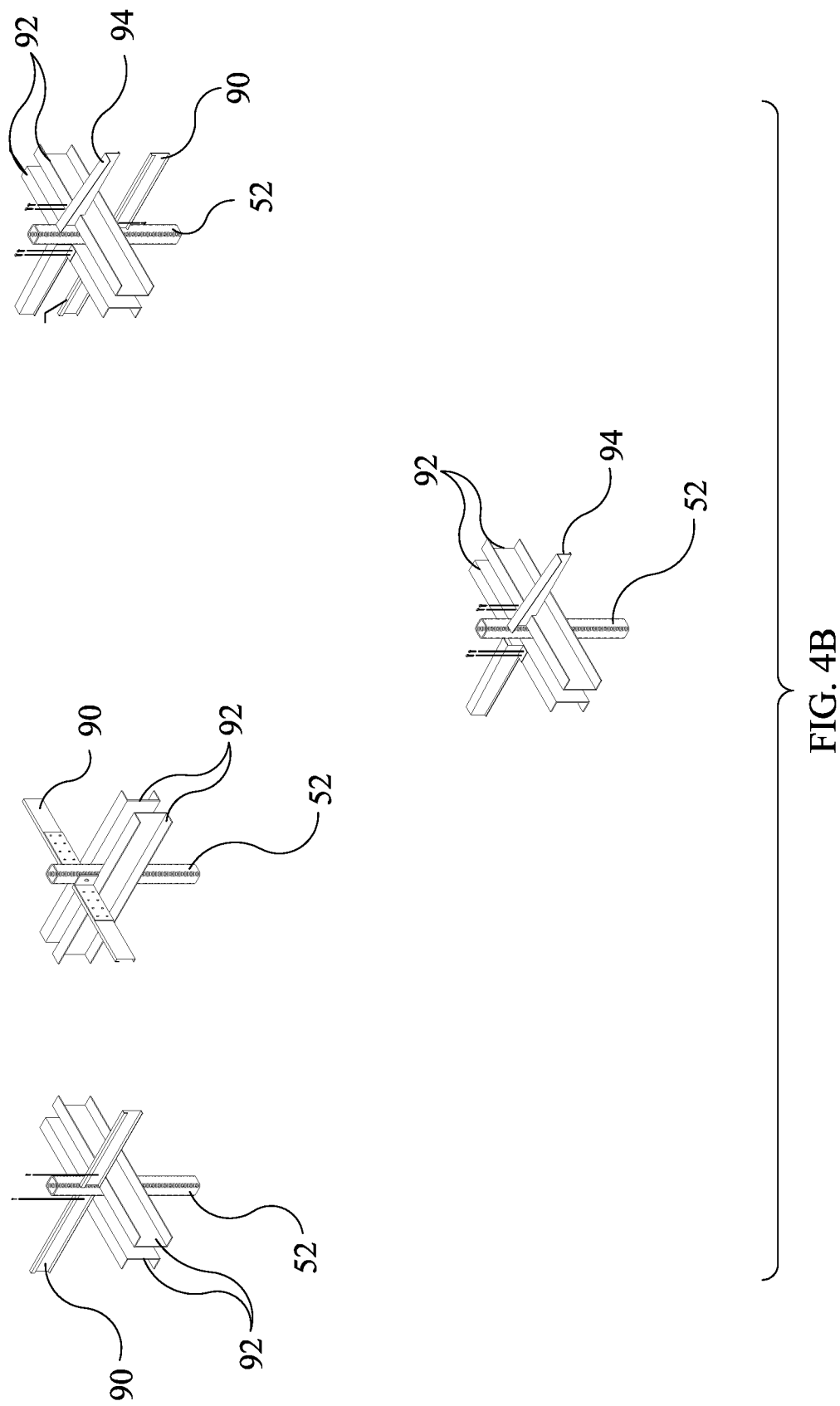
FIG. 4B is another exemplary embodiment of attachment means for the bracing, catwalk bridges and support studs and columns used in the present invention.
Figure 9:
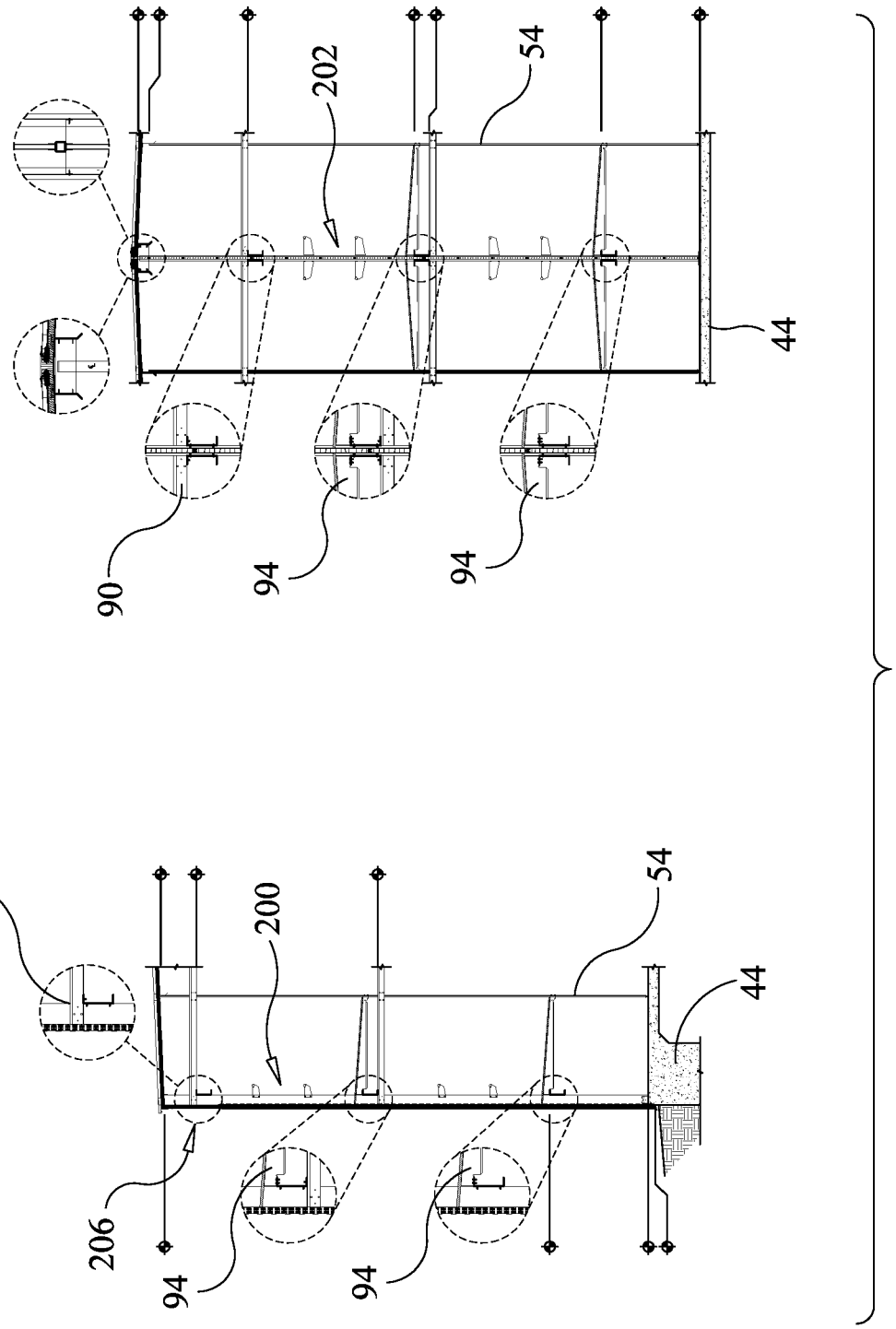
FIG. 9 is a detailed diagram view of various bracing means used throughout the structure depicting how and where exemplary embodiments of the bracing can be coupled to the various support elements (e.g., columns and studs)

The cage assembly 76 can include multiple layers of bracing. FIGS. 4A and 4B illustrate the various connections points of braces 90 and how they couple to the columns 52 and/or studs 50 of the aviary structure. For each row of columns 52/studs 50, at least one beam or a series of beams coupled to one another can span the length of the structure. As shown in FIG. 4A, one exemplary embodiment can use a c-channel beam 92 to aid in supporting the various braces and better allow coupling of the braces 90 to the c-channel beam 92 and/or column 52/stud 50. In one exemplary embodiment, a plurality of c-channel beams 92 can be oriented on a column 52 or stud 50 to provide for mounting points of various levels of bracing, such as a lower, intermediate, and upper brace 90. Similarly, these beams can provide mounting points for braces/bridges 94 that can couple/anchor the cage assemblies 76 to the center partition columns 52 or the side wall studs 50/columns 52, as shown in FIG. 9. Additionally, these bridges 94 can be used to couple/anchor together cage assemblies 76 in adjacent rows, such as rows 60-72.

In another aspect, the cages 74 can have an upper brace 90 that connects the cage assemblies 76 to a steel column 52 or stud 50. Additionally, an intermediate brace 90 and a bridge connection can be used to couple the cage assemblies 76 to a steel column 52 or stud 50. Furthermore, a lower brace 90 and bridge 94 can be used to couple the cage assemblies 76 to a steel column 52 or stud 50. These braces 90 can span the width of the aviary structure and reinforce the structural rigidity of the individual rows 60-72 of the cages assemblies 76 and the structure as a whole. Similarly, the upper, intermediate, and lower braces 90 can also be used to couple each of the cage assemblies 76 within a row 60-72 together and, in turn, the cage assemblies 76 of multiple rows 60-72 together. This can provide structural rigidity between the rows 60-72 of the cages 74 as well as to the steel studs 50 and columns 52. The braces 90 can use a brace splice to connect two ends of separate braces 90 to one another. The bracing 90 can be coupled to the columns 52/studs 50 using any suitable means such as fasteners (i.e. screws, bolts, etc.).

Figure 3A:
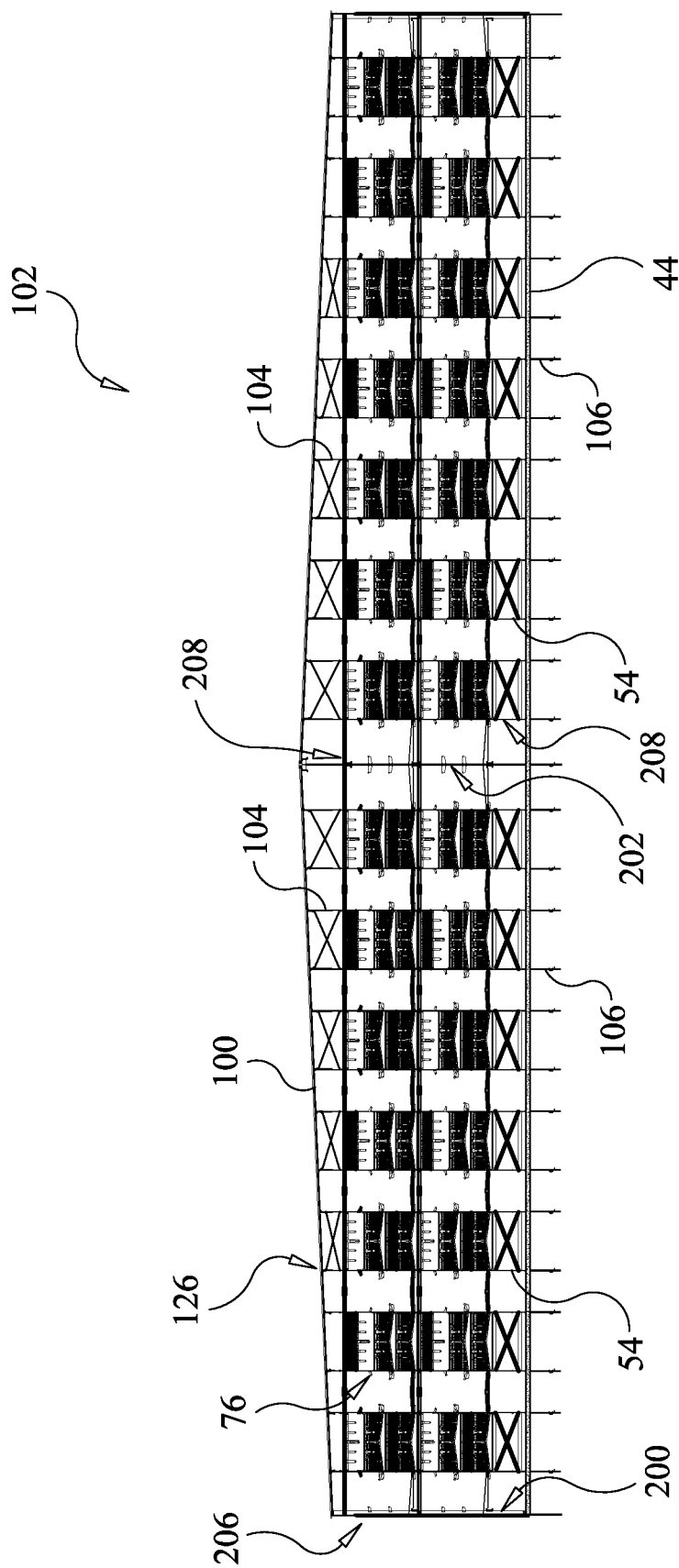
FIG. 3A is a cross section view of an exemplary embodiment of the present invention.
Figure 3B:
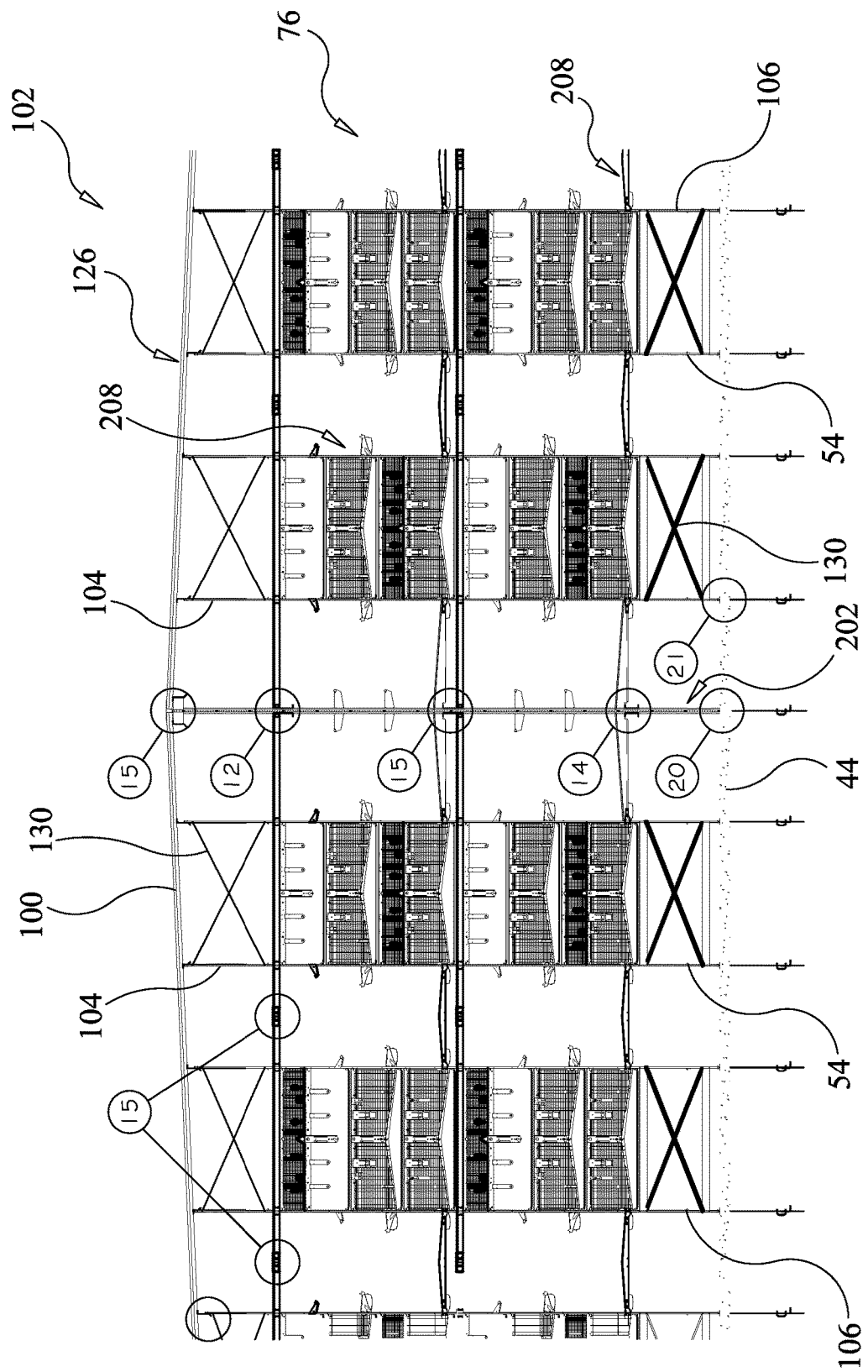
FIG. 3B is a detailed cross section view of an exemplary embodiment of the central portion of the aviary.

As illustrated in FIGS. 3A and 3B, the cage assemblies 76 can have a plurality of legs 54 that extend down to the foundation 44 and up to a roof 100 of the structure 102. Upper cage leg portions 104 can extend upwards from the tops of the cage assemblies 76 above the upper brace 90. Similarly, lower cage leg portions 106 can extend downward below the cage assemblies 76 and below the lower brace 90 or bridge 94. The cage legs 54 that extend below the lower brace 90 can also include a cage foot 108 that is used to couple the cage assemblies 76 to the concrete slab 44 using concrete anchors 110. The lower leg portions 106 can be coupled to the foundation 44 using cage leg foot anchors 110 as shown in FIG. 8. In one exemplary embodiment, the foot anchors 110 can be installed to the foundation 44 prior to the cage assemblies 76.

FIGS. 2C and 2D illustrate the location of the cage legs 54 and where they can be coupled to the foundation 44 with respect to the columns 52 and studs 50 of the aviary structure 102. Each upper cage leg 104 can also include a purlin 120 (FIG. 5) that extends upwards from the upper cage legs 104 to couple the cage legs 54 to the roof 100 of the structure 102. The purlins 120 can be a low purlin 122 or a high purlin 124 dependent upon the purlin's location with respect to the pitch of the roof 100. A cage assembly 76 will typically have one side where the upper cage legs 104 require the use of a low purlin 122, while the other side of upper cage legs 104 require a high purlin 124 to tie into the roof structure 100.

FIG. 5 depicts in greater detail the configuration of both the high purlins 124 and low purlins 122 and their relationship to the cage legs 54 and the roof panels 126. The purlins 120 can be used in connection with a roof diaphragm brace and a specific ridge purlin 120 to comprise a roof assembly 100, which serves as the support structure for the roof panels 126. The purlins 120 can be coupled to the cage assemblies 76, columns 52, or studs 50 using any suitable means, such as using fastener(s) or welding the purlins 120 to the desired location.

As shown in FIG. 9, the various braces 90/bridges 94 (upper, lower, or intermediate) can also be coupled to the cage legs 54 of the cage assemblies 76 in any suitable location necessary to secure the cage legs 54 to the braces 90/bridges 94. The bracing further strengthens and provides rigidity to the cage assemblies 76 and the aviary structure 102, thereby establishing a robust internal support structure. Any suitable material can be used for the bracing. In one exemplary embodiment, the bracing can be comprised of galvanized steel.

As shown in FIG. 3B, additional bracing 130 can be used above and below the cage assemblies 76 to provide structural rigidity between the respective upper cage leg portions 104 and lower cage leg portions 106, as well as strengthen the support of cage assemblies 76 and the concrete slab 44 and roof 100 of the structure 102. This bracing 130 can be assembled during the assembly of the cage assemblies 76 and can be used to provide rigidity to both the upper cage leg portions 104 and lower cage leg portions 106 of each cage assemblies 76. In one exemplary embodiment, x-bracing members 130 can be used at tops of the cage assemblies 76 to provide for a more rigid structure and reinforcement of the cage assemblies 76 to the concrete slab 44 and roof 100 of the structure 102. Furthermore, the x-bracing 130 helps stiffen the purlins 120 used to support the roof panels 126.

Figure 11:
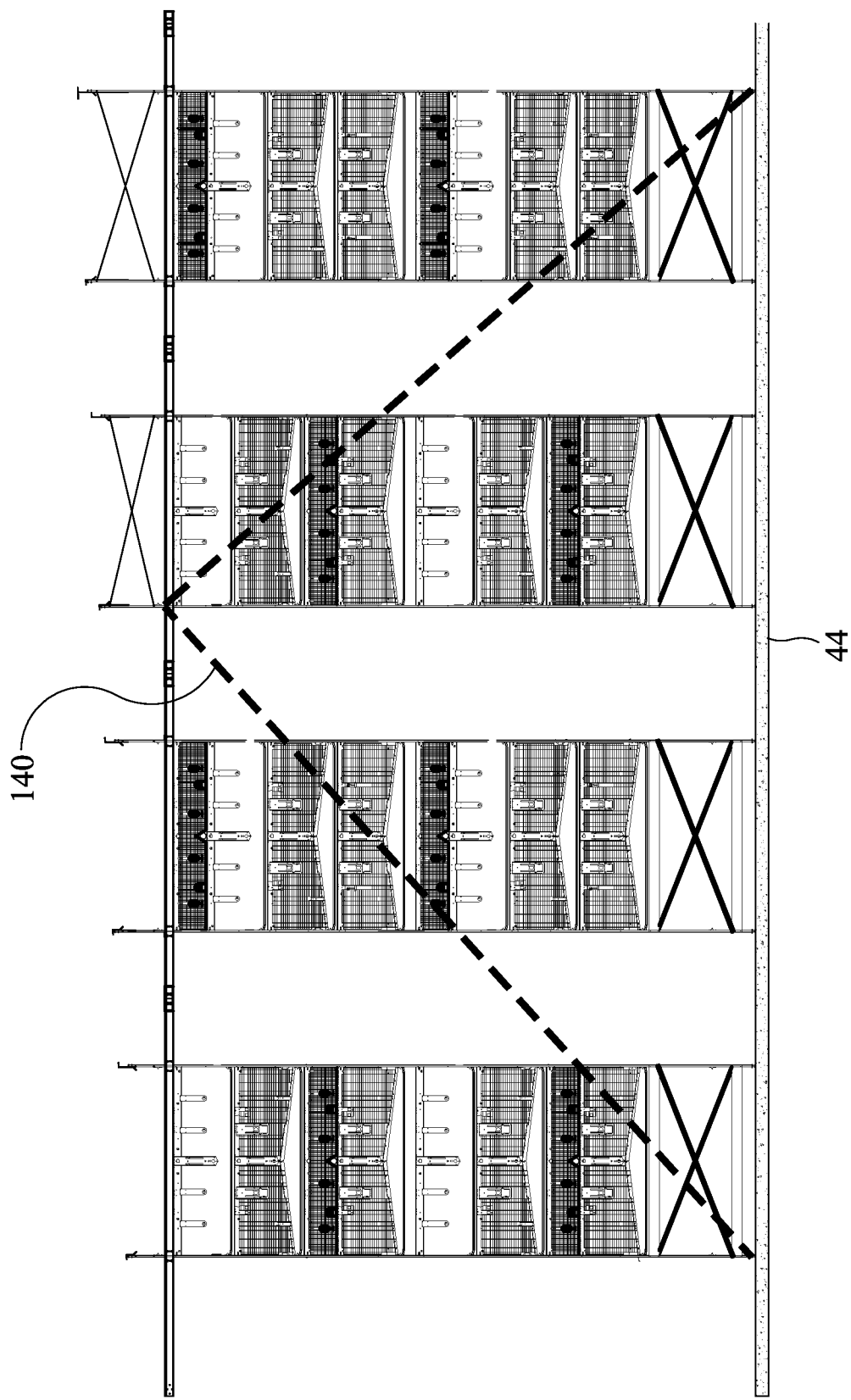
FIG. 11 is a perspective view of an exemplary embodiment of rope/cable bracing used across multiple cage assemblies.

Moreover, additional bracing 140 can be provided in some embodiments, as shown in FIG. 11. In one exemplary embodiment, such additional bracing 140 is provided by the addition of a line, such as a cable or rope. The cable can be run down between each cage assembly 76 to tie the cage assemblies 76 together. The cable can be made of any suitable material, such as a rope of organic material or a metal braided line. The cable can span from the top of a cage assembly 76 in one row 60-72 and run diagonally across a plurality of rows 60-72 of cage assemblies 76 to the foundation 44. In one exemplary embodiment, the line can be run diagonally. A plurality of lines can be used to form an x-brace 140 down the row 60-72 of cage assemblies 76. FIG. 11 illustrates various examples of how the line can be configured to best brace the cage assemblies 76.

Figure 7:
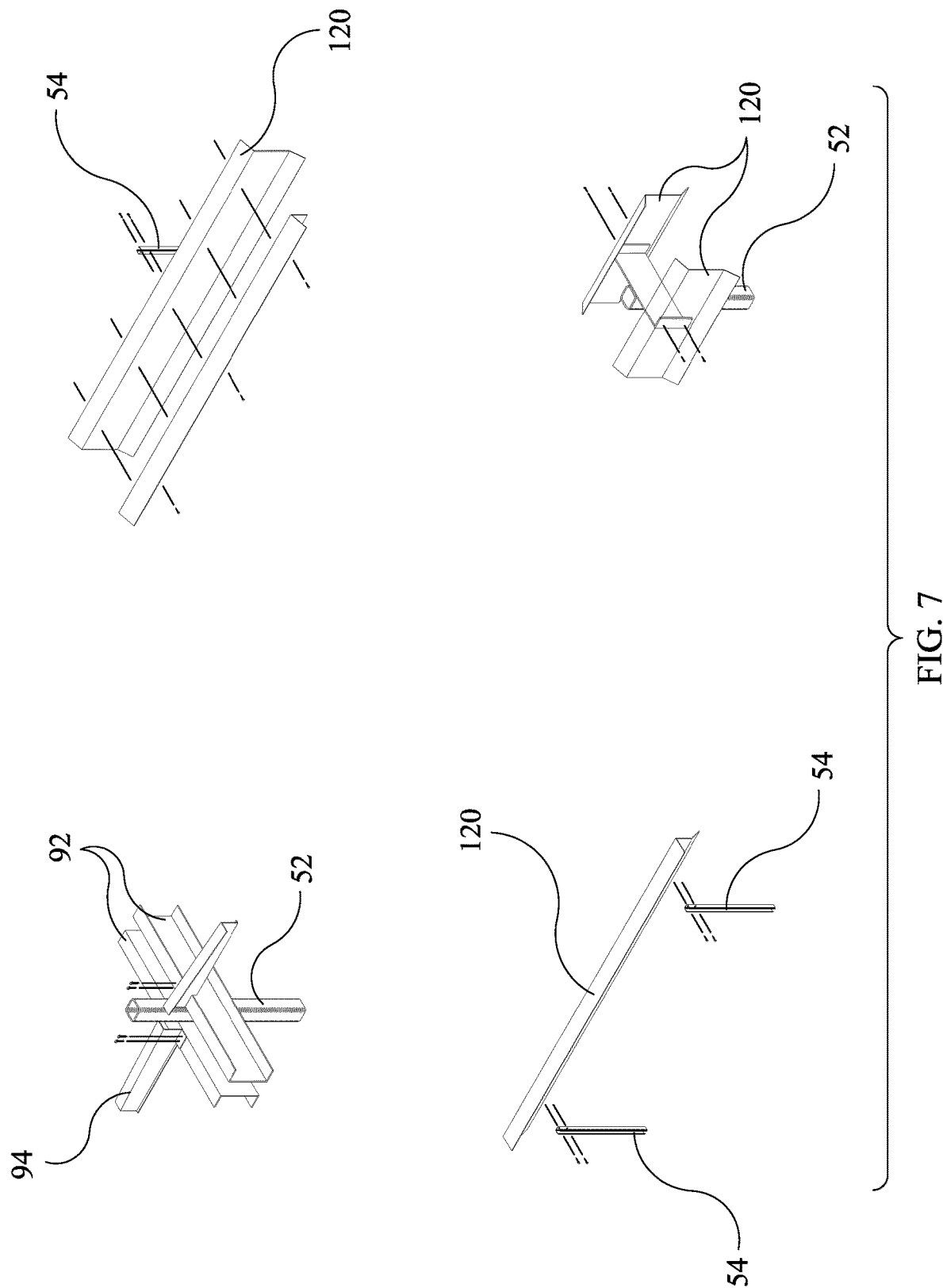
FIG. 7 is a perspective view of an exemplary embodiment of the purlin and the ridge frame of the roof assembly.

At the center of the structure 102 can be a plurality of columns 52 or studs 50 running the entire length of the structure 102 as shown in FIG. 2D. The center columns 52/studs 50 can use specific ridge purlins 120 that are configured to be suited to accommodate the central peak of the roof structure 100. FIG. 7 illustrates one exemplary embodiment of the ridge purlins 120 and ridge purlin bracket 150 used at the center of the structure 102. The ridge purlin 120 can extend the length of the aviary 102. Each of the purlins 120 can have a pre-determined pitch to accommodate a desired roof pitch. As further illustrated in FIG. 7, the ridge purlins 120 can have a ridge purlin bracket 150 that extends perpendicularly between the two ridge purlins 120 to couple each set of ridge purlins 120 to its respective center column 52 of the aviary structure 102.

Figure 6:
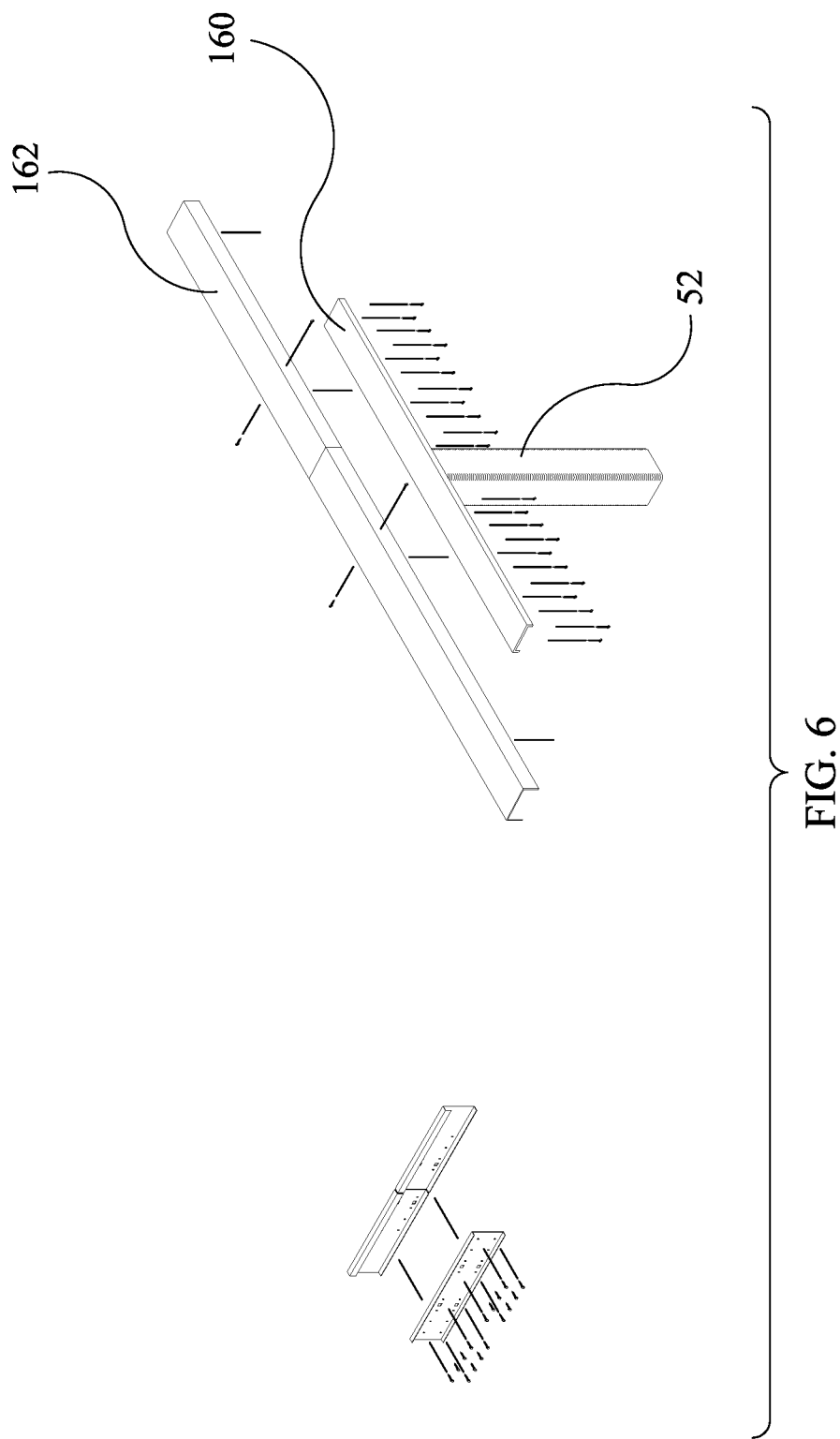
FIG. 6 is a perspective view of a roof diaphragm brace used to secure the roof diaphragm to the peripheral studs and columns of the structure.

FIG. 6 illustrates a roof diaphragm brace 160 that can be used to couple the roof panels to the aviary structure 102. The roof diaphragm brace 160 can run the entire length of the cage portion of the building 102. In another exemplary embodiment, the roof diaphragm brace 160 can be coupled to the top of a column 52 or stud 50. Alternatively, the roof diaphragm brace 160 can be isolated only to the steel column areas of the building 102. In this embodiment, the roof diaphragm brace 160 is coupled to the steel columns 52 and can extend laterally from the top of the column 52 a pre-determined distance so as to provide a greater coupling area to secure the roof panels or roof diaphragm. The roof diaphragm brace 160 can be coupled using any suitable means, such as by using a fastener or welding the roof diaphragm to the desired location. The roof diaphragm brace 160 extends a pre-determined distance perpendicularly from either side of the column 52. The diaphragm brace 160 can be located below a continuous wall cap 162, which can span the entire length of the structure 102. The diaphragm brace 160 can provide a coupling point for the continuous wall cap 162.

Next, the roofing panels comprising insulation and paneling material, such as a metal panel, can be coupled to a roof assembly 100 at the continuous wall cap 162 and the purlins 120 extending from the cage assemblies 76. Similar paneling and insulation can be used to "wrap" the exterior of the building 102 to form the side walls of the aviary structure 102. In one exemplary embodiment, the paneling comprises an insulated interior and a metal exterior. The paneling can be coupled to mounting points on the columns 52/studs 50, or alternatively be installed in any suitable location as determined during installation of the panels.

The roof panels can be applied during the application of the side panel installation during the "wrap" step of the assembly of the structure 102. At this point the structure 102 includes internal support structures, at 168, including, but not limited to, the studs 50 and columns 52 tied into the cage assemblies 76 using the aforementioned bracing, such as braces 90 and/or bridges 94 between the cage assemblies 76 and columns 52 or studs 50.

Figure 10:
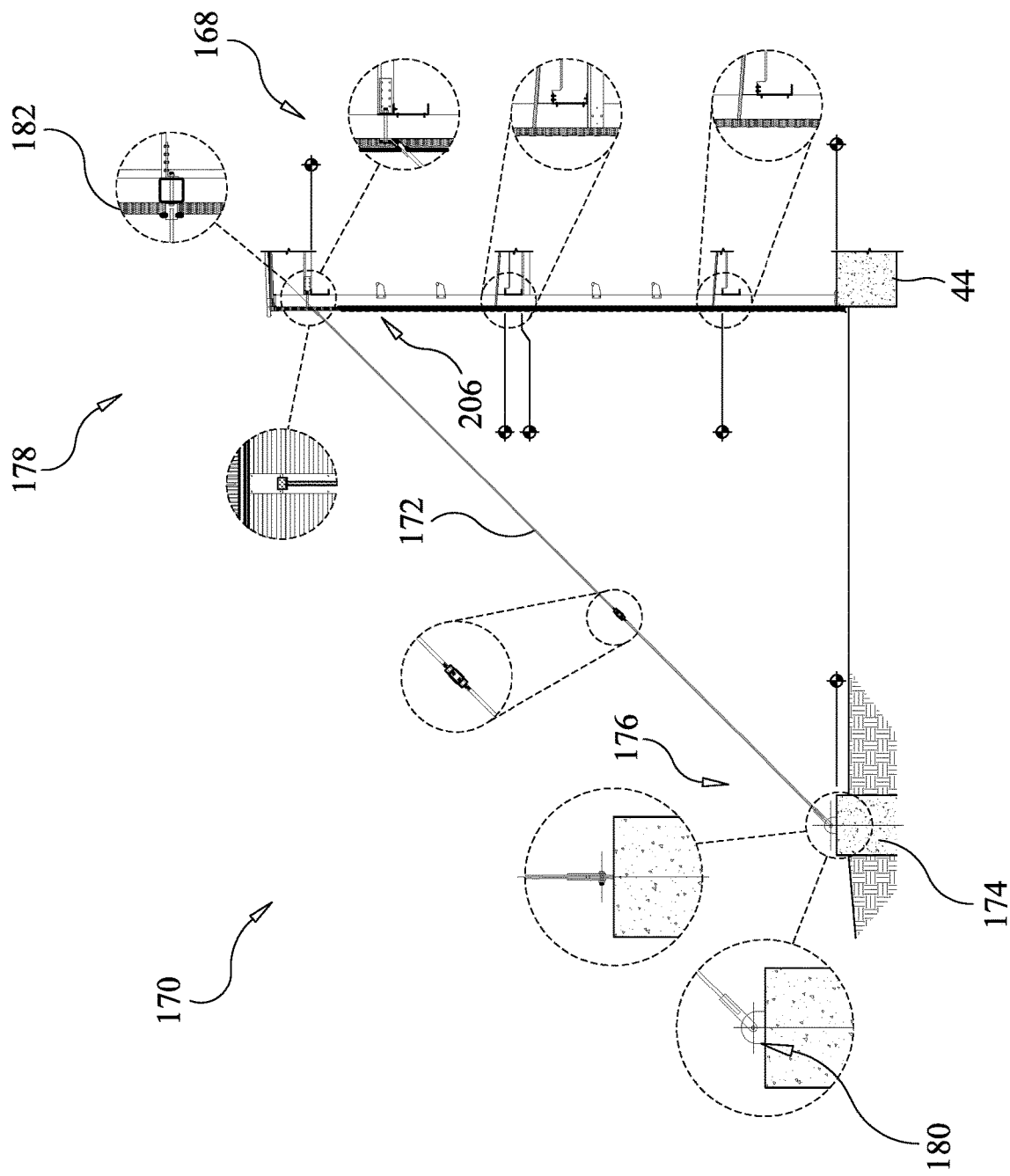
FIG. 10 is a perspective view of an exemplary embodiment of a diagonal rod brace for bracing the internal support structures of the aviary.

An external support structure can be applied to further strengthen and provide rigidity to the aviary structure 102. FIG. 10 illustrates the use of external support structure(s) 170, comprising an external rod/wall brace 172 and at least one "dead man" foundation 174 to provide additional support to the structure 102. The rod brace 172 can be comprised of any suitable material, such as steel. The rod brace 172 can have a foundation coupling end 176 and structure coupling end 178. The foundation coupling end 176 of the rod brace 172 can be coupled/anchored to the aforementioned dead man foundation 174 that can be located at a pre-determined distance from the edge of the foundation 44 of the structure 102. A brace plate 180 can be installed into the dead man foundation 174 and used to couple the rod brace 172 to the dead man foundation 174. The rod brace 172 can be comprised of a plurality of rods that can be coupled together using rod connections to form a single rod brace 172.

The structure coupling end 178 of the rod brace 172 can be coupled to a column 52 of the structure 102 a pre-determined distance away from, but adjacent to the dead man foundation 174. The structure coupling end 178 can be coupled at about the top of the column 52 and proximate to where the upper brace 90 is coupled to the column 52. The structure coupling end 178 of the rod brace 172 can have an upper brace rod assembly 182. The upper brace rod assembly 182 can be coupled to the column 52 in a pre-determined location. Insulation can be applied around the junction of the rod brace 172 and the wall paneling 206 and column 52 to insulate the structure 44. In one preferred embodiment, the insulation used can be a spray foam insulation to ensure adequate sealing from the external environment. The rod brace 172 can be disposed in an angular position between the top of a column 52 to the foundation 44 at ground level. Alternative means of anchoring the rod brace 172 are also contemplated. For example, helical screw-in anchors may alternatively be used. Further, alternative means for anchoring the building, or structure 102, are also contemplated.

As previously described, the aviary structure 102 can include additional features and elements to aid in ventilation and maintaining the overall cleanliness of the aviary 102. These features can include at least one belt extending through the cage assemblies 76 below a nesting area to remove a deposit from at least part of the cage assembly 76. A deposit may include, but is not limited to, one or more items such as manure, an egg, litter, feathers, feed, or a dead bird. In one embodiment, the belt extends through the cage assemblies 76 along the length of a row 60-72 of cage assemblies 76. In one embodiment, a belt extends along the length of each row of cage assemblies 76. In one embodiment, the belt carries manure from the cage assemblies 76 to a collection area positioned outside of the cage assemblies 76. By removing deposits, particularly manure, from at least part of the cage assembly 76, ammonia levels within the aviary 102 are significantly reduced. Additionally, the need for an individual to enter the cage 74 and clean the cage 74 by hand is greatly reduced.

Method of Constructing Aviary Structure

Figure 12:
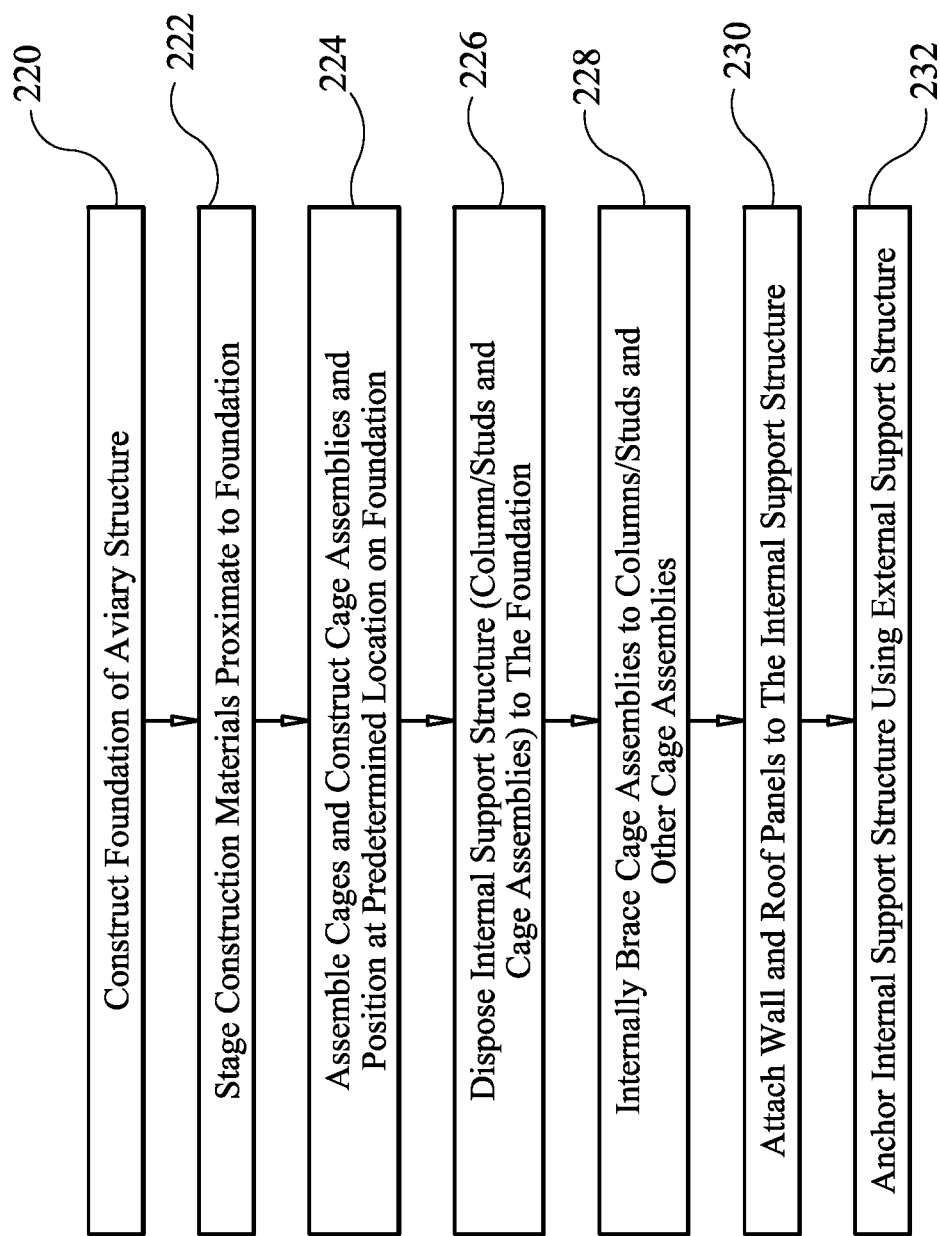
FIG. 12 illustrates a method for constructing a structure.

FIG. 12 illustrates a method of building an exemplary embodiment of the present invention that is comprised of various phases. As shown at Box 220, a floor or foundation 44 can be constructed to support the cage assemblies 76 and the columns 52 and studs 50 of the aviary structure 102. The foundation 44 can be constructed of any suitable material, such as concrete, timbers, simple attachment points set in the ground for vertical support members, and other options familiar to skilled artisans. At Box 222, construction materials are staged proximate to the foundation 44. In one embodiment, and as referenced at Box 224, a cage assembly 76 can be constructed with at least one aviary cage 74. The cage assembly 76 can have a plurality of vertical support members above and below the aviary cage 74. Columns 52 or studs 50 can be anchored to the foundation 44 and extend upward from the foundation 44, at Box 226. The cage assemblies 76 can be disposed on, or anchored to, the foundation 44 at a predetermined location that can be etched onto the foundation 44.

At Box 228, the cage assemblies 76 can then be coupled/anchored to the foundation 44 and coupled to columns 52/studs 50 using bracing that runs horizontally between the cage assemblies 76 and the columns 52/studs 50. Cage assemblies 76 can be constructed in blocks and coupled to each other to form rows 60-72. Horizontal bracing can be used to couple rows 60-72 of cage assemblies 76 together while leaving space in between rows 60-72 of cage assemblies 76. A roof assembly 100 can be attached to the upper purlins 124 and lower purlins 122 of the cage assemblies 76. The roof assembly 100 can also be coupled to the columns 52/studs 50 of the structure 102.

Side walls 200 can be constructed and coupled to the peripheral columns 52/studs 50 surrounding the foundation 44 and cage assemblies 76. Similarly, a center partition wall 202 can be coupled to each side of the center columns 52. Plenums 204 can be installed on both the side walls 200 and the center partition wall 202 and configured to provide ventilation to the aviary structure 102. The side walls 200, center partition wall 202 and roof assembly 100 can stabilize the columns 52/studs 50 and cage assemblies 76 against winds and other external environmental elements to which the structure 102 may be exposed. At Box 230, the side wall panels 206 and roof panel can enclose at least a portion of the cage assemblies 76. In another embodiment, the roof panels and wall panels 206 can fully enclose the cage assemblies 76 within the aviary structure 102.

The nature and method of this type of construction can be described as a "wrap-the-cage" construction, whereby the internal components, such as the cage assemblies 76, and the support structure (i.e., the columns 52, studs 50, bracing 90, etc.) are first constructed on the foundation 44. The paneling (i.e., the walls and roof) can then "wrap" or be constructed around the internal components. This allows time and materials to be saved during the construction of the building 102.

The vertical columns 52/studs 50, cage assemblies 76, and bracing 90 all assist in supporting the external structure of the aviary 102, such as the roof paneling and wall paneling 206. Additional external bracing 170 can be used to further strengthen the aviary structure 102, at Box 232. A rod brace 172 can be coupled proximate to the top of pre-determined columns 52 positioned down each side of the structure 102. The other end of the rod braces 172 can be coupled to dead man foundations 174 located a pre-determined distance away from the edge of the aviary foundation 44. These rod braces 172 essentially tether the internal support structure and roof assembly 100 to the ground to further strengthen the external and internal structures against winds and other external environment conditions.

Once the foundation 44 is complete, assembly of the cage assemblies 76 begins at one end of the building 102 and concurrent construction of the building diaphragm or external components (i.e., the wall panels 206, roof panels, and exterior bracing 170) enables the inside and outside of the building 102 to be completed at essentially the same time as the interior and exterior work progresses from one end of the building 102 to the other.

It will be apparent to those skilled in the art that various modifications and variations can be made in the disclosed system and method without departing from the scope of the disclosure. Other embodiments will be apparent to those skilled in the art from consideration of the specification and practice of the various implementations disclosed herein. It is intended that the specification and examples be considered as exemplary only, with a true scope being indicated by the following claims and their equivalents.

What is claimed is:

1. An aviary structure including:
    a foundation;
    an internal support structure including a plurality of aviary cages, wherein a first portion of one or more of the aviary cages are coupled to the foundation;
    a plurality of peripheral columns coupled to the foundation, wherein a second portion of one or more of the aviary cages are coupled with the peripheral columns using bracing;
    at least one side wall coupled to the peripheral columns;
    a roof assembly coupled to vertical support members of the aviary cages; and
    a plurality of wall panels supported on the side wall and a plurality of roof panels supported on the roof assembly.

2. The aviary structure of claim 1, further including an external support structure having a first end coupled to one of the peripheral columns and a second end coupled to an attachment location a predetermined distance away from the foundation.

3. The aviary structure of claim 1, wherein said roof assembly includes a plurality of purlins, a plurality of roof brace diaphragms, and a center ridge purlin assembly.

4. The aviary structure of claim 3, wherein said purlins extend vertically from the vertical support members of the aviary cages, wherein the roof panels are coupled to said purlins.

5. The aviary structure of claim 1, wherein said internal support structure further includes a plurality of studs interconnected with the peripheral columns and configured to form a rigid structure, wherein the studs are coupled to the foundation.

6. The aviary structure of claim 5, wherein the internal support structure further includes a plurality of bracing and bridges, wherein said bracing and bridges are coupled between the columns, studs and aviary cages.

7. The aviary structure of claim 1, further including x-bracing members reinforcing coupling of the aviary cages to the foundation or the roof assembly.

8. The aviary structure of claim 1, wherein the roof assembly is also coupled to the peripheral columns.

* * * * *